(12) United States Patent
Andersson

(10) Patent No.: US 10,399,738 B2
(45) Date of Patent: Sep. 3, 2019

(54) OPENING DEVICE AND METHOD FOR MANUFACTURING THE SAME, AND A PACKAGING MATERIAL PROVIDED WITH SAID OPENING DEVICE

(71) Applicant: Tetra Laval Holdings & Finance S.A., Pully (CH)

(72) Inventor: Pär Andersson, Lund (SE)

(73) Assignee: TETRA LAVAL HOLDINGS & FINANCE S.A., Pully (CH)

( * ) Notice: Subject to any disclaimer, the term of this patent is extended or adjusted under 35 U.S.C. 154(b) by 369 days.

(21) Appl. No.: 15/339,124

(22) Filed: Oct. 31, 2016

(65) Prior Publication Data

US 2017/0043902 A1 Feb. 16, 2017

Related U.S. Application Data

(62) Division of application No. 13/515,649, filed as application No. PCT/EP2010/069396 on Dec. 10, 2010, now Pat. No. 9,505,519.

(30) Foreign Application Priority Data

Dec. 14, 2009 (SE) ...................................... 0901552

(51) Int. Cl.
*B65D 17/34* (2006.01)
*B65D 17/28* (2006.01)
(Continued)

(52) U.S. Cl.
CPC .... *B65D 17/4011* (2018.01); *B29C 45/14754* (2013.01); *B65D 5/72* (2013.01); *B29L 2031/565* (2013.01)

(58) Field of Classification Search
CPC ........ B65D 17/4011; B29C 2045/1436; B29C 2045/14467; B29C 2045/14368; B29C 45/14467
See application file for complete search history.

(56) References Cited

U.S. PATENT DOCUMENTS 2,619,255 A * 11/1952 Bricout ................ B65D 17/506
220/323
4,060,891 A 12/1977 Lerner
(Continued)

FOREIGN PATENT DOCUMENTS

EP 0505851 A1 9/1992
EP 0546999 A1 6/1993
(Continued)

OTHER PUBLICATIONS

International Search Report (PCT/ISA/210) dated Feb. 22, 2011, by the European Patent Office as the International Searching Authority for International Application No. PCT/EP2010/069396.
(Continued)

*Primary Examiner* — Galen H Hauth
(74) *Attorney, Agent, or Firm* — Buchanan Ingersoll & Rooney PC

(57) ABSTRACT

An opening device for a packaging container, the packaging container being formed from a packaging material having an upper side constituting the outside of the packaging container and a lower side constituting the inside of the container, the opening device including two operational parts, a preformed support part arranged on the upper side of the packaging material and a membrane part arranged on the lower side of the container and extending into openings of the support part such as to mechanically connect the two parts, and wherein the materials of the membrane part and the support part are thermally incompatible polymer materials.

17 Claims, 3 Drawing Sheets

(51) Int. Cl.
  *B29C 45/14* (2006.01)
  *B65D 5/72* (2006.01)
  *B29L 31/56* (2006.01)

(56) References Cited

U.S. PATENT DOCUMENTS

| | | | |
|---|---|---|---|
| 4,893,725 A * | 1/1990 | Ball | B29C 45/14344 |
| | | | 220/269 |
| 5,019,104 A * | 5/1991 | Whiteside | A61F 2/3877 |
| | | | 264/274 |
| 5,199,618 A | 4/1993 | Reil et al. | |
| 5,303,838 A * | 4/1994 | Luch | B65D 17/506 |
| | | | 220/266 |
| 5,372,300 A | 12/1994 | Nedstedt | |
| 5,381,935 A | 1/1995 | Mock | |
| 5,395,005 A * | 3/1995 | Yoshida | B29C 45/14221 |
| | | | 220/270 |
| 5,413,238 A | 5/1995 | Mock | |
| 5,498,225 A | 3/1996 | Nedstedt | |
| 5,816,429 A | 10/1998 | Kobayashi | |
| 5,829,672 A | 11/1998 | Mogard et al. | |
| 6,845,902 B1 | 1/2005 | Bömer et al. | |
| 2004/0026421 A1 | 2/2004 | Holm et al. | |
| 2010/0166923 A1 | 7/2010 | Martini et al. | |

FOREIGN PATENT DOCUMENTS

| | | |
|---|---|---|
| EP | 2008787 A1 | 12/2008 |
| JP | 06-092351 A | 4/1994 |
| JP | 10-338253 A | 12/1998 |
| JP | 2008-308191 A | 12/2008 |
| JP | 2009-126552 A | 11/2009 |
| WO | WO 97/39960 A1 | 10/1997 |
| WO | WO 02/070365 A1 | 9/2002 |
| WO | WO 2008/004939 A1 | 1/2008 |

OTHER PUBLICATIONS

International Type Search Report (Form PCT/ISA/201) dated Jun. 10, 2010, by the Swedish Patent Office in the corresponding International Application No. ITS/SE2009/00403. (5 pages).

\* cited by examiner

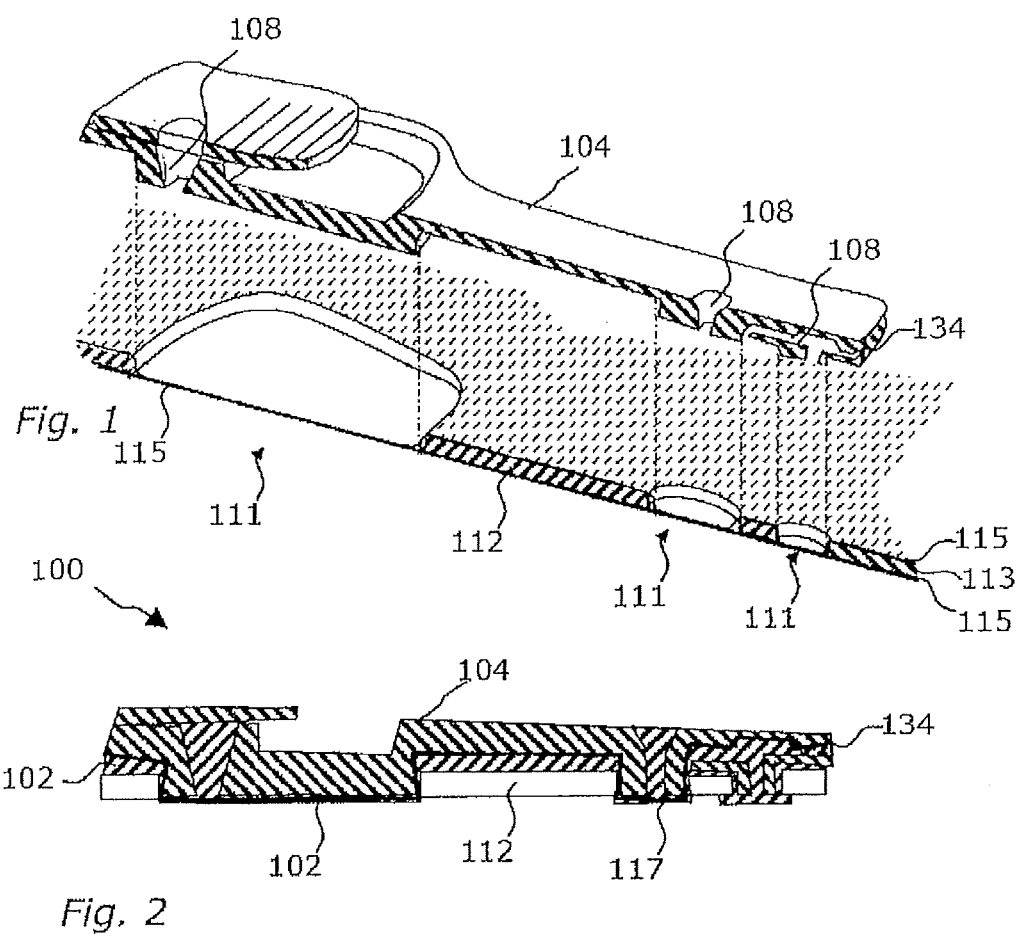

OPENING DEVICE AND METHOD FOR MANUFACTURING THE SAME, AND A PACKAGING MATERIAL PROVIDED WITH SAID OPENING DEVICE

This application is a divisional of Ser. No. 13/515,649 filed on Jun. 13, 2012, which is a U.S. National Stage application of International Application No. PCT/EP2010/ 069396 filed on Dec. 10, 2010, which claims priority to Swedish Patent Application No. 0901552-0 filed on Dec. 14, 2009, the entire contents of all three of which are incorporated herein by reference.

TECHNICAL FIELD

The present invention relates to an opening device and to a method for manufacturing said opening device onto a packaging material. The invention also relates to a packaging container provided with such an opening device.

BACKGROUND

Packaging containers for consumer use are provided with an opening device of some sort. Some preferential features of an opening device are that it should be easy to actuate and provide an adequate and reliable seal for the product contained in the packaging container. The definition of an adequate seal will vary, depending on the type of product contained in the packaging container, and how the packaging container will be stored etc. A common demand is that the opening device, before it is opened the first time, should prevent microorganisms from accessing the product from outside, since this will rapidly deteriorate the quality of the product. In some instances it is also desired to prevent certain gases, such as oxygen, from entering the packaging container. Since a regular screw cap typically does not provide an adequate seal on its own, a membrane is commonly added. The membrane seals the opening of the packaging container by providing a continuous mass of material which may be welded to a rim of the opening of the packaging container. In a case where gases should be prevented from entering the packaging container, this usually accomplished by use of suitable barrier materials for the opening device, the membrane, and the packaging container itself.

An opening device comprising a cap and a membrane is e.g. disclosed in WO02/070365.

Such an opening device may be manufactured remote from a filling machine and attached to a packaging container after the manufacturing thereof. The opening device may also be manufactured in-situ, directly onto the packaging container or directly onto the packaging material that will form the packaging container. Such an opening device is disclosed in U.S. Pat. No. 5,829,672 and in EP 2 008 787. One advantage of the latter type of device is that the logistics related to the transportation of premade opening devices is eliminated or at least reduced. The present invention relates to an improved opening device of the latter type.

SUMMARY

The present invention eliminates or at least alleviates the above problems and reaches the stated purposes by the provision of an opening device adapted to be arranged on both sides of a packaging laminate, said opening device comprising a support part and a membrane part, wherein a membrane portion of the membrane part is mechanically connected to the support part, such that removal of the support portion from the opening device results in removal of the membrane portion. The opening device may preferably be manufactured using the method of claim 10, and may also be intended for a packaging container in accordance with claim 13. Specific embodiments are defined by the dependent claims.

The use of a mechanical bond or constructional bond between the different parts of the opening device enables the inventive properties. Since the bonding is ensured mechanically the different parts of the opening device may be made of materials that are not thermally compatible, e.g., which does not bond together by the heat present during production, i.e. as the molten plastic for the membrane part is injected into the mould containing the preformed support part. In this context "thermally incompatible", which will be used throughout this specification may be said to imply that the materials are so arranged that their interface surfaces will not fuse, (chemically) bond or adhere during manufacture of the opening device, at least not in any permanent. This may also be put in terms of the materials being "non-weldable" to each other under the circumstances of the manufacturing process (variables including temperature, pressure, contact time etc). The skilled person realizes that even if the materials of the preformed support part and the membrane part as such would be weldable or compatible in an adhesive way, the surface of the preformed support part may comprise a coating as to make it incompatible to the material of the membrane part. There are several options for such a non-stick treatment, such as a powder-based compound being applied to one of the surfaces before injection moulding e.g. in the form of a "paint". The feature of absence of an adhesive bond enables new designs for the opening device and its cooperation with a packaging container. Further, this results in that the membrane part may be optimized (material, design) for its purpose, and the support part may be optimized for its purpose as the same time, as long as this criterion is fulfilled. The present invention enables, in one or more embodiments thereof, a true one-action opening where both a membrane seal (the membrane portion of the membrane part) and a reclosable cap (the support part) may be removed in one single manipulation, which may considered less cumbersome than the two-step opening of prior art, where a cap has to be removed before a membrane may be accessed. The material of the membrane part may preferably be thermally compatible with material of the packaging material to which the opening device is applied. In this way the membrane part will associate with the packaging material during the manufacture of the opening device, which will be explained in more detail in the description of embodiments.

BRIEF DESCRIPTION OF THE DRAWINGS

FIG. 1 is a schematic cross section in perspective of support part of an opening device in accordance with a first embodiment of the present invention, shown in an exploded view.

FIG. 2 is a cross sectional view of an opening device comprising the part of FIG. 1 arranged on a packaging laminate.

DETAILED DESCRIPTION OF EMBODIMENTS

Figure 3:
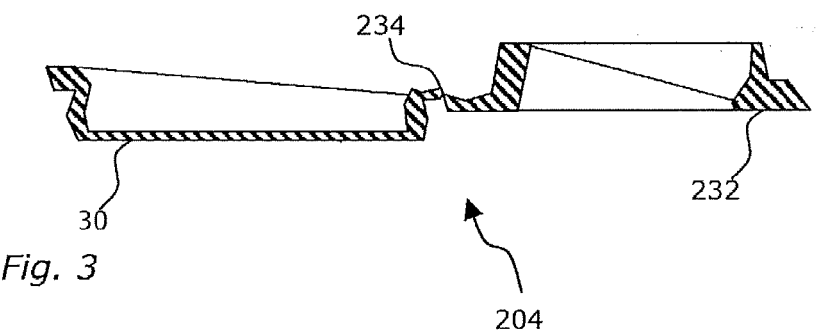
FIG. 3 is a schematic cross section of a support part for an opening device in accordance with a second embodiment of the present invention.

For further elucidation of the functionally and versatility of the present invention exemplifying applications will be elucidated in a detailed description of various embodiments.

In the first embodiment of the present invention the opening device comprise a support part 104, which is premade. Note that premade in this context may include any type of two-step moulding in which one part is manufactured before the other. Premade consequently includes situations ranging from where the support part 104 is manufactured in another plant completely to situations where the support part 104 is manufactured moments before the second part, a membrane part 102, in a comoulding process. In the present embodiment the support part 104 is arranged in a mould half, which aligns with a section of packaging material 112. The packaging material 112 comprises a pattern of full or partial penetrations or openings 111, where the partial penetrations e.g. may include a section where a core of cardboard 113 has been removed yet where a layer of foil 115, such as PE foil and/or aluminum foil remains. The support part 104 also comprises openings 108. A second mould half is then aligned with the first mould half, yet on the opposite side of the packaging material 112 thus forming a mould cavity. In a consecutive step a melt is injected into the cavity, which melt fills up the cavity, and thus defining a membrane part 102. The melt will enter all available openings 108 of the support part and thus mechanically connect the membrane part 102 to the support part 104. In locations where only the foil 115 is present, without any backing support from either the support part 104 or one of the mould halves, the melt will penetrate the foil 115, and fill up any voids. The injected melt, which preferably is a plastic material, is thermally incompatible with the material of the support part 104, meaning that the two parts will not adhere to each other, and only be mechanically attached. It may be considered most straightforward to use different materials for the two parts, such that the non-adherence will appear automatically, yet there are more ways to achieve the desired effect. One example is that a surface of the support part 104 is coated with a suitable coating which prevents adherence. The openings 108 may have an undercut shape, such as to prevent the membrane part from being pulled out from the openings 108. The openings may also have a rectilinear shape, wherein the mechanical connection may be achieved by allowing the membrane part 102 to expand on the opposite side of the support part (which e.g. may be accomplished by an adequate design of the first mould half) in which case a rivet-like shape will provide the mechanical connection. Examples of both these designs are illustrated in relation to the first embodiment.

The mould halves are not illustrated in the drawings, yet their interior shapes are clear from the exterior shape of the opening device.

In one or more embodiments the membrane part 102 will thermally join with a PE foil 115 of the packaging material 112, effectively welding the opening device to the packaging material. Variations include using another material than PE for the foil 115 and the membrane part 102, and the skilled person realizes the criteria that needs to be fulfilled; the membrane part 102 should be made of a material that is thermally incompatible with the material of the support part 104, yet thermally compatible with the material of the foil 115 or to the material of another structure to which it may attach. In this way an adequate seal may be accomplished more or less automatically in the process of manufacturing the opening device.

The inventive device according to this first embodiment thus comprises a support part 104 having undercut sections into which a membrane part 102 extends, thus mechanically joining the membrane part 102 and the support part 104. The membrane part 102 is further attached to a portion of the packaging material 112 to which the opening device is arranged, thus forming a continuous surface providing an efficient seal.

It is worth noticing that an opening device formed in the above way may have a complex shape, and the mould halves as well as the preformed support part may be designed such as to provide any plausible desired properties to the finished opening device. In the first embodiment this may be exemplified by the hinge portion 134, effectively acting as a hinge during opening of the device, such that the support portion 104 may be used as a reclosable lid when a packaging container provided with the opening device has been opened. Another specific feature is highlighted by reference numeral 117. This rivet like structure will follow the support portion 104 during opening, thus creating an air inlet, enabling a smoother pouring of product from the packaging container. The present opening device is also provided with a pull tab in order to facilitate opening.

The bold line of FIG. 2 illustrates roughly where the opening device will separate during opening, effectively breaking the seal provided by the membrane part 102. It may also be noted that the portion of the membrane part 102 being arranged on the same side of the packaging material as the support part 104 may be designed to improve pouring qualities.

Figure 4:
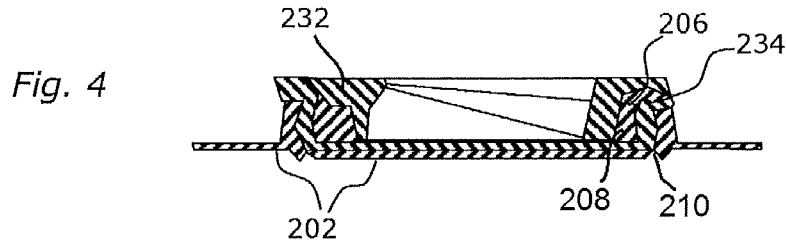
FIG. 4 is a cross section of an opening device in accordance with a second embodiment of the present invention, in a closed position thereof.

The second embodiment of the present invention resembles the first, and is based on the same inventive concept. To simplify understanding the same reference numerals have been used, increased by 100, whenever possible. In this embodiment the support part 204 is formed by two portions 230, 232 manufactured in one piece in the folded up position of FIG. 3. The portion 232 to the right of FIG. 3 is the grip portion 232 (being the actuation portion) and the portion to the left is the lid portion 230. The two portions are joined by a material bridge 234 providing a hinge arrangement. The membrane part 202 is formed from a second material, as for the previous embodiments penetrating into openings 208 of the support part 204, as illustrated in FIG. 4. In this case too the skilled person being faced with the present description will realize that there are numerous alternatives for achieving the mechanical attachment between the support part and the membrane part. Also the membrane part 202 comprises a weakening structure 210, having the same purpose and criteria as have already been mentioned in relation to the first embodiment. In the present embodiment the membrane part 202 will provide a pouring spout as well as an attachment flange 218, and the support part 204 will provide a reclosable opening as it snaps into the pouring spout.

Figure 5:
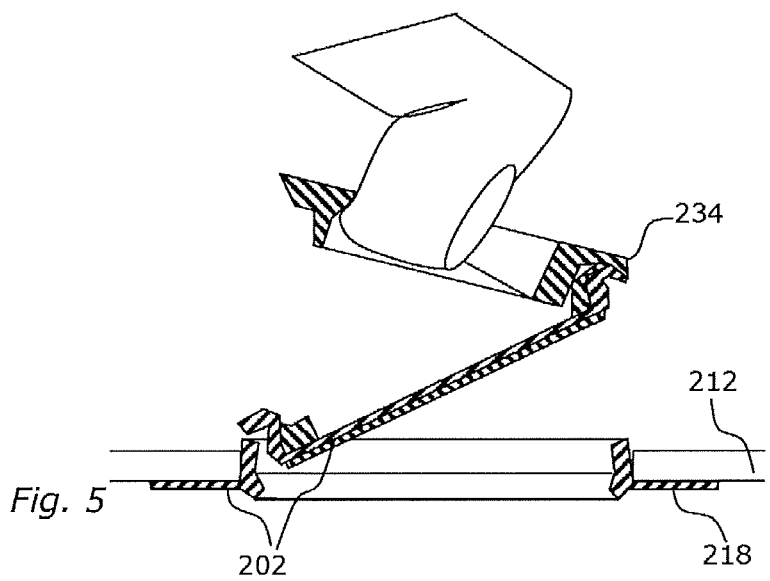
FIG. 5 is a cross section of the opening of the opening device of FIG. 4, arranged on a packaging container.

According to this embodiment the opening device is opened by gripping and pulling the grip portion 232 at its end remote to the material bridge 234, providing the hinge arrangement. As shown in FIG. 5 the lid portion 230 will force the membrane part 202 to follow the movement and thus the membrane part 202 will rupture along the weakening structure 210. The particular construction of the support portion 204 showed in relation to the second embodiment will provide an adequate concentration of forces for the membrane part 202 to rupture, and make it simple for a user to apply an adequate force.

In an alternative embodiment the support part may be formed by one piece, without the hinge action described, in which case the membrane part 202 could instead start to rupture at the diametrically opposite end of the weakening line as compared to the embodiment described referring to FIGS. 3-5. Such an embodiment would resemble the first embodiment described in reference to FIGS. 1 and 2. Again, the fit between interconnecting parts is perfect, due to the inventive method of manufacturing the opening device.

Since the present embodiment relies on a snap fit rather than a twisting action there are several alternatives for the shape of the opening device as seen from above, and basically any shape may be possible. In particular, the shape may be adapted to optimize the use of the area available on the packaging container (which may be limited by folds, seals, etc.).

It should be noted that all embodiments are provided for illustrative purposes only, and there are many plausible designs for the support part, the membrane part with its pull tab, etc. and the invention should therefore not be limited in this aspect. For example, neither of the details has to have an essentially circular design. Since (compression) moulding is the preferred manufacturing method there is no immediate benefit in having circular components, and they may thus have any functional design, such as oval, rectangular, etc. The illustrated pull tab may instead be a pull ring, or non-present.

A functionally equivalent solution to the conical openings of the support part, as defined in the above, would e.g. be to form heads with increased diameter on the projections, as these have passed through the openings, as illustrated by the "rivets" of FIG. 1.

All embodiments of the present invention are preferably manufactured with the same method. This method includes the use of the support part as a preform, which is arranged in a mould cavity before injection of the material for the membrane part. The actual injection of material is made in a conventional way, and the parameters relating to this may be readily deduced by the skilled person. The same is valid for the choice of number of and location for injection points.

The technique for accomplishing the features of the membrane part may vary, yet a few examples are worth mentioning:

The fact that the membrane part, and in particular the weakening structure should be very thin poses some difficulties, since the material injected into the cavity may not be willing to fill such thin voids. If the voids are not filled, the effect will be an inadequate seal. Therefore a compression moulding technique (or injection compression) may be used, in which the volume of the cavity is reduced after injection of material. Such a technique is described in WO 2008004939.

Figure 6:
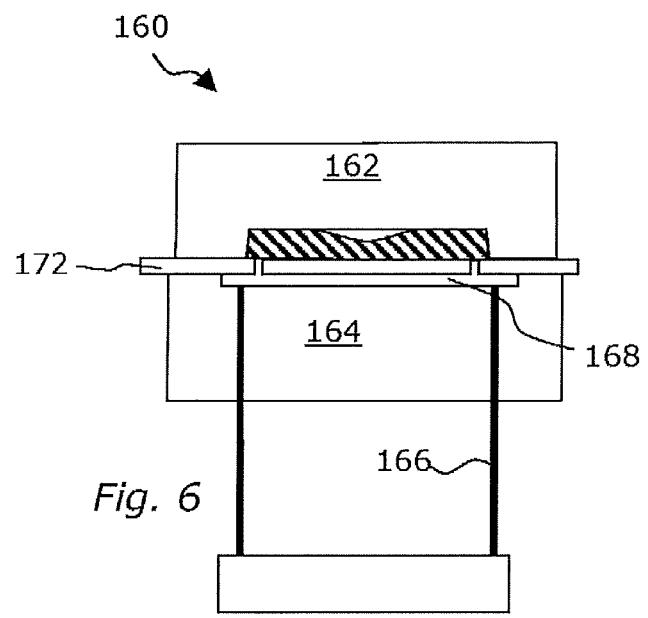
FIGS. 6 and 7 are schematic cross section illustrating two stages of a manufacturing method according to one embodiment of the present invention.
Figure 7:
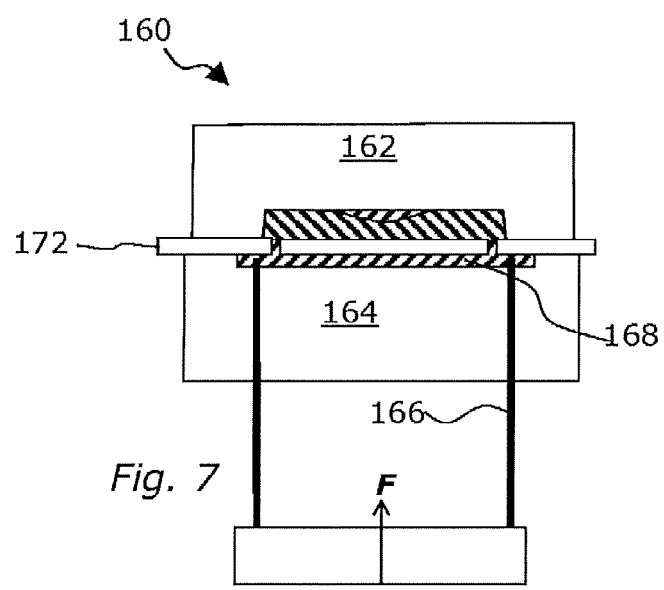

A schematic cross section of one particular embodiment is shown in FIGS. 6 and 7. Here the mould 160 comprises a first mould half 162 and a second mould half 164, movable in relation to the first mould half 162 and designed to sandwich the packaging material 172 between them and to form a mould cavity. The second mould half comprises a movable tool 166 arranged to form the weakening line. This movable tool 166 is movable relative to the second mould half 164 such that before the injected material has hardened the movable tool may be slid (further) into the cavity in order to compress the material thus forming the weakening line and achieving the desired thickness. In the view of FIGS. 6 and 7 a support part 168 is arranged in the first mould half, wherein said support part may correspond to any one of the support parts already described in this description. According to this inventive moulding method, a support part does not have to be arranged in the second mould half, or in the mould cavity at all. The skilled person realizes that the drawing illustrates a principle rather than a concrete design and that e.g. the position of the injection points lacks in the drawing and will vary between different mould designs. It is also obvious that the shape of an actual mould would be far more elaborate, including every detail of the design in question.

In any embodiment a trough opening or through hole in the preform may be subject to special arrangements. Such special arrangements may be considered in order to avoid leakage of content through any small clearance created in the area of the through hole due to shrinkage of the injected polymer. According to one or more embodiment the through hole is surrounded by a groove arrangement, basically an indentation in the preform, preferably forming a closed path (a loop). During injection the polymer will enter the groove and as the polymer shrinks during cooling it will pinch towards the radially inner edge of the groove, and provide a seal. The sealing pinching action may be effected even the groove only consists of a radially inner edge, yet the force holding the two parts together is likely to be stronger if the groove also as a well defined radially outer edge.

The groove arrangement does not have to be in the immediate vicinity of the through hole, as long as the through hole is encircled. One embodiment includes a groove arranged in the area radially inside the weakening line. Such a groove would serve a triple purpose of preventing leakage (as noted above), preventing liquid from entering in a clearance between the preform and the membrane portion, and attaching the membrane portion to the preform. To enhance the function of the groove arrangement it, or at least a radially inner edge of it, may be slightly undercut. This feature will enhance the coupling strength of the arrangement.

Looking at FIG. 1 typical locations for these groove arrangements could be around one or more of the openings 108.

The invention claimed is:

1. A method for manufacturing an opening device comprising:
arranging a preform in a first mold half, the preform including through openings;
arranging the first mold half on a first side of packaging material, in register with a hole pattern of the packaging material, so that the through openings of the preform are in register with the hole pattern of the packaging material;
arranging a second mold half on a second side of the packaging material so that at least one mold cavity is defined by the mold halves, the preform and the packaging material; and
injecting a melt of polymer material that is thermally incompatible with the preform into the at least one mold cavity to cause the melt to at least partly penetrate through the through openings of the preform and through the packaging material at the hole pattern of the packaging material so that the preform is a support part of the opening device and the injected melt is a membrane part of the opening device,
wherein: i) the packaging material is a laminate that includes a cardboard core sandwiched between coating layers of polymer and a metallic foil between the cardboard core and one of the coating layers of polymer; ii) the hole pattern of the packaging material includes a plurality of spaced-apart through holes in the cardboard core each covered by the metallic foil; and iii) the injecting of the melt of polymer material includes injecting the melt of polymer material so that the melt of polymer material penetrates the metallic foil spanning the through holes in the cardboard core.

2. The method according to claim 1, further comprising advancing a movable part inside the mold cavity to reduce a volume of the mold cavity locally and form a weakening line in the membrane part after the injection of the melt of polymer material.

3. The method according to claim 1, further comprising allowing the melt of polymer material to cool, after the injecting of the melt of polymer material, so that the polymer material shrinks in the openings of the preform to seal the openings of the preform.

4. The method according to claim 1, wherein the through openings of the preform possess a conical shape.

5. The method according to claim 1, wherein the melt of polymer material is thermally compatible with the packaging material.

6. The method according to claim 1, wherein
one portion of the membrane part of the opening device penetrates through at least one of the through openings after the opening device is formed, and
an other portion of the membrane part of the opening device is positioned below the at least one through opening of the support part after the opening device is formed.

7. The method according to claim 1, wherein dimensions of the membrane part on both sides of the at least one opening exceed dimensions of the at least one opening.

8. The method according to claim 1, wherein the through openings of the support part possess an axial extent and a varying cross-sectional size along the axial extent to mechanically connect the membrane part to the support part by way of the through openings.

9. A method for manufacturing an opening device comprising:
arranging a support part on an upper side of packaging material, the support part comprising at least one opening and the packaging material comprising a hole pattern, the support part being made of a material;
positioning the support part relative to the packaging material so that a portion of the support part fits in the hole pattern of the packaging material;
injecting a polymer material on a lower side of the packaging material so that the polymer material at least partly penetrates through the packaging material and into the at least one opening of the support part, the polymer material being a melted polymer which is thermally incompatible with the material from which the support part is made; and
allowing the melted polymer material to cool after the polymer material at least partly penetrates through the packaging material and into the at least one opening of the support part so that the polymer material shrinks in the at least one opening of the support part and forms a membrane part of the opening device,
wherein: i) the packaging material is a laminate that includes a cardboard core sandwiched between coating layers of polymer and a metallic foil between the cardboard core and one of the coating layers of polymer; ii) the hole pattern of the packaging material includes a plurality of spaced-apart through holes in the cardboard core each covered by the metallic foil; and iii) the injecting of the polymer material includes injecting the polymer material so that the polymer material penetrates the metallic foil spanning the through holes in the cardboard core.

10. The method according to claim 9, further comprising surrounding the support part on the upper side of the packaging material with a first mold half;
surrounding the lower side of the packaging material with a second mold half such that a mold cavity is defined between the first mold half and the second mold half; and
the injection of the polymer material including injecting the polymer material into the mold cavity formed between the first mold half and the second mold half.

11. The method according to claim 10, further comprising advancing a movable part inside the mold cavity to reduce a volume of the mold cavity locally and form a weakening line in the membrane part after the injection of the polymer material.

12. The method according to claim 9, wherein the support part possesses a first surface facing the packaging material and an oppositely facing second surface, the at least one opening of the support part being a through opening that opens to the first and second surfaces of the support part, the through opening possessing a cross-section that varies along its length so that the cross-section of a portion of the through opening that opens to the second surface is larger than the cross-section of a portion of the through opening that opens to the first surface.

13. The method according to claim 9, wherein the at least one opening of the support part is a through opening possessing a conical shape.

14. The method according to claim 9, wherein the melt of the polymer material is thermally compatible with the packaging material.

15. The method according to claim 9, wherein
a portion of the membrane part of the opening device penetrates through the at least one opening of the support part after the opening device is formed, and
an other portion of the membrane part of the opening device remains below the at least one opening of the support part after the opening device is formed.

16. The method according to claim 9, wherein dimensions of the membrane part on both sides of the at least one opening exceed dimensions of the at least one opening.

17. The method according to claim 9, wherein the at least one opening in the support part comprises plural openings in the support part, each of the openings in the support part possessing an axial extent and a varying cross-sectional size along the axial extent to mechanically connect the membrane part to the support part by way of the openings.

* * * * *